United States Patent [19]
Dietz et al.

[11] Patent Number: 5,836,548
[45] Date of Patent: Nov. 17, 1998

[54] CARGO MANAGEMENT SYSTEMS

[75] Inventors: Phillip Dietz, Sandy; Donald P. Cox, Orem, both of Utah

[73] Assignee: Skyhook Technologies, Inc., Orem, Utah

[21] Appl. No.: 689,302

[22] Filed: Aug. 7, 1996

Related U.S. Application Data

[63] Continuation-in-part of Ser. No. 384,414, Feb. 6, 1995, Pat. No. 5,593,113.

[51] Int. Cl.$^6$ .................................................. B64D 1/08
[52] U.S. Cl. ................................... 244/137.1; 244/137.4; 294/82.26; 294/81.56; 73/862.621
[58] Field of Search ............................... 244/137.1, 137.4, 244/118.1; 294/82.26, 82.25, 82.31, 907, 82.15, 82.24, 87.1, 86.4, 81.56; 310/232, 90; 403/169, 170, 217, 53, 52, 79, 165, 164

[56] References Cited

U.S. PATENT DOCUMENTS

| | | |
|---|---|---|
| 340,618 | 5/1943 | Magni et al. . |
| 2,379,383 | 6/1945 | Steel . |
| 2,651,533 | 9/1953 | Miller ........................................ 403/164 |
| 2,820,397 | 1/1958 | Durkin . |
| 3,656,796 | 4/1972 | Cook ........................................ 294/87.1 |
| 3,690,602 | 9/1972 | Marsh . |
| 3,838,836 | 10/1974 | Asseo et al. ........................... 244/137.4 |
| 3,946,971 | 3/1976 | Chadwick ............................... 244/137.4 |
| 3,966,249 | 6/1976 | Lindqvist ................................. 294/86.41 |
| 4,256,012 | 3/1981 | Cowart et al. . |
| 4,267,987 | 5/1981 | McDonnell ............................. 244/137.4 |
| 4,378,919 | 4/1983 | Smith . |
| 4,575,028 | 3/1986 | Dean et al. . |
| 4,576,406 | 3/1986 | Johnson et al. ........................ 294/86.41 |
| 4,589,615 | 5/1986 | Walker, Jr. . |
| 4,609,168 | 9/1986 | Dean et al. . |
| 4,664,588 | 5/1987 | Newell et al. .......................... 294/86.4 |
| 4,793,053 | 12/1988 | Zuccaro et al. ........................ 294/86.4 |
| 4,815,780 | 3/1989 | Obrist ..................................... 294/86.4 |
| 4,826,109 | 5/1989 | Camus . |
| 4,881,601 | 11/1989 | Smith . |
| 5,238,208 | 8/1993 | Davis . |
| 5,352,056 | 10/1994 | Chandler ................................ 403/79 |
| 5,499,785 | 3/1996 | Roberts et al. ........................ 244/2 |

OTHER PUBLICATIONS

Aeronautical Accessories, Inc. Product Literature for Hook Carrousel, (Part Nos. 099–186–390, 099–190–210).

*Primary Examiner*—Robert J. Oberleitner
*Assistant Examiner*—Tien Dinh
*Attorney, Agent, or Firm*—Workman, Nydegger & Seeley

[57] ABSTRACT

A cargo management system comprising an airframe suspended from an aircraft by a cable assembly. The airframe includes a loading frame which comprises a plurality of horizontal struts and vertical struts which are interconnected at corner assemblies. A payload hook is connected to each of the corner assemblies by a universal joint. A load cell used in combination with the universal joint assists in weighing the payloads attached to each of the payload hooks. The airframe also includes a hub assembly which includes a hub rigidly mounted to the vertical struts and a spindle rotatably disposed within the hub. A U-bolt is connected to the spindle which in turn can be selectively attached to the cable assembly. As such, the hub and loading frame are freely rotatable relative to the spindle and cable assembly.

31 Claims, 9 Drawing Sheets

CARGO MANAGEMENT SYSTEMS

RELATED APPLICATIONS

This application is a continuation-in-part of U.S. patent application Ser. No. 08/384,414 which was filed Feb. 6, 1995, in the name of Donald P. Cox for Methods and Apparatus For Selectively Attaching and Releasing Multiple Payloads Suspended From an Aircraft U.S. Pat. No. 5,593,113. For purpose of disclosure, the above identified application is incorporated herein by specific reference.

BACKGROUND OF THE INVENTION

1. The Field of the Invention

The present invention relates to system for transporting multiple payloads and, more specifically, systems for selectively attaching and releasing multiple payloads suspended beneath an aircraft.

2. The Relevant Technology

Helicopters have long been used to deliver payloads of different size and shape. Traditionally, a cable is suspended from a helicopter having a hook attached to one end of the cable. By attaching the hook to a payload, the helicopter is able to transport the payload to a desired location. Suspending the payload beneath a helicopter permits the helicopter to transport oversized cargo, such as a jeep.

Furthermore, a helicopter is able to deliver the payload to unique and specific locations, such as on top of a building or in rugged terrain, where an airplane could not land. In addition, the use of a suspended cable permits a helicopter to deliver or receive cargo without actually having to land. By lowering the cable, a receiving party can remove or attach a payload to the hook. This is most beneficial with regard to emergency rescues and in delivering payloads in congested areas.

Although there are numerous benefits in using a conventional hook and cable assembly to deliver a payload suspended beneath a helicopter, several shortcomings are also found. For example, using a single cable and hook assembly typically only permits transporting a single payload per flight. Such an assembly necessitates numerous flights, costing both time and money, to deliver multiple payloads which cannot simultaneously be attached to a single hook.

Furthermore, to remove a payload from a conventional hook and cable assembly, either the helicopter must land or the payload must be lowered to the ground and manually removed from the hook. Such processes require both time and the necessity of a receiving party at the unloading location to unload the payload. The necessity of a receiving party to remove a payload is detrimental in an emergency situation where it would be preferable to jettison the payload during flight or where it is desirable to release a payload at a location where there is no receiving party.

In an attempt to alleviate these problems, carrousel hook systems have been made. The carrousel hook systems comprise a frame having a plurality of hooks attached thereto. The frame is suspended from a helicopter by a support cable. Likewise, an electrical cable extends from the helicopter to each of the hooks. By triggering a switch within the helicopter, the hooks can be consecutively opened, thereby releasing the attached loads.

Several problems or shortcomings, however, have also been encountered with the carrousel hook systems. Forces such as the wind and movement of the aircraft can result in rotation of the carrousel frame which in turn applies a torsional force on the support cables and the helicopter. Such a force can damage the cables and the connection to the helicopter. Likewise, the torsional force can affect the navigation ability of the helicopter.

The hooks on the carrousel hook system are designed to operate in a consecutive manner. For example, hook number 4 cannot be opened until hooks 1–3 have been opened. Such a configuration severely limits the ability of the operator to selectively release the attached payloads. It is also difficult for the operator to determine which of the hooks is next to release and if a payload has fully been removed from a hook. Furthermore, such a configuration does not permit all of the payloads to be dropped concurrently.

Conventional hook assemblies are also fixed structures that come in a set size with a set number of hooks. Such a configuration can be a drawback where the number and kinds of loads may frequently vary between uses.

The current hook systems also do not address some of the general problems in the art. As with all aircraft, helicopters have a load limit. Exceeding the load capacity of a helicopter can affect the navigational ability of the aircraft or result in failure of the aircraft. Current embodiments for transporting cargo suspended from an aircraft provide no means other than manually weighing the cargo before loading to determine the weight of cargo. The ability to always know the weight of the payloads is especially important during repeated rapid loading and unloading of cargo.

OBJECTS AND BRIEF SUMMARY OF THE INVENTION

Accordingly, it is an object of the present invention to provide systems for carrying and selectively releasing multiple payload suspended from an aircraft.

Another object of the present invention is to provided systems as discussed above in which multiple payloads can be repeatedly attached and released for suspension from an aircraft.

It is another object of the invention to provide systems as discussed above in which the payloads and carrier system can rotate freely relative to the cable when suspended from the aircraft, thereby preventing torsional force onto the cable and aircraft.

Yet another object of the present invention is to provide systems as discussed above in which the pilot of the aircraft having the payloads suspended therefrom is capable of knowing when a payload is attached or released from the aircraft without having to see the payload.

Another object of the present invention is to provide systems that can be selectively altered in configuration to have a desired number of payload hooks.

It is yet another object of the present invention to provide systems as discussed above in which the payloads are stabilized during flight of the aircraft so as to minimize rotation of the payloads.

Another object of the present invention is to provide systems for selectively weighing individual payloads or the total weight of the payloads as the aircraft suspends the payloads off the ground.

Finally, another object of the present invention is to provide systems as discussed above, in which the payloads and apparatus can be selectively or collectively dropped, such as in an emergency situation.

To achieve the forgoing objects, and in accordance with the invention as embodied and broadly described herein, a payload management system is provided for selectively attaching and selectively releasing multiple payloads suspended from an aircraft. The payload management system comprises an airframe which is suspended beneath a helicopter or other comparable aircraft by a cable assembly. The airframe is formed from a plurality of vertical struts and horizontal struts which are interconnected at corner assemblies. The corner assemblies are designed so that the horizontal struts can be selectively assembled into one of two outside perimeter configurations. That is, in the preferred embodiment the horizontal struts of the loading frame can be assembled into either a three-sided polygon or a six-sided polygon. The ability to vary the shape of the loading frame allows one to selectively configure the loading frame to have a desired number of payload hooks to carry a desired number of payloads.

Attached to each of the corner assembly is a payload hook that is capable of selectively attaching and releasing a payload. The payload hook is attached to the corner assembly by a universal joint which enables the payload hook to maintain a substantially vertical orientation as the loading frame is tilted. Furthermore, a load cell is positioned between the universal joint and the payload hook for selectively weighing each payload. As a result of the universal joint, the load vector created by the payload is also continuously vertically applied to the load cell, thereby producing a continually accurate reading of the weight of the payload independent of the orientation of the loading frame.

The top end of each vertical strut is connected to a hub assembly. The hub assembly includes a hub which is rigidly connected to the vertical struts and has a passageway longitudinally extending therethrough. Disposed within the passage way is a spindle. A pair of tapered bearing assemblies are positioned between the spindle and the hub to permit the hub and attached airframe to freely rotate relative to the spindle. Ridigly attached to the top of the spindle is a U-bolt assembly. The U-bolt assembly includes a U-bolt configured for selective connection to the cable assembly. In this configuration, the loading frame with the attached payloads can freely rotate while the cable assembly and spindle remain substantially stationary. As a result, minimal torsional force is applied to the cable assembly The cable assembly typically comprises an elongated stainless steel cable having a loop at one end for attachment to a helicopter and a cargo hook mounted on the opposing end. The cargo hook is typically fashioned so as to be able to hook the U-bolt on the airframe to selectively carry the airframe.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
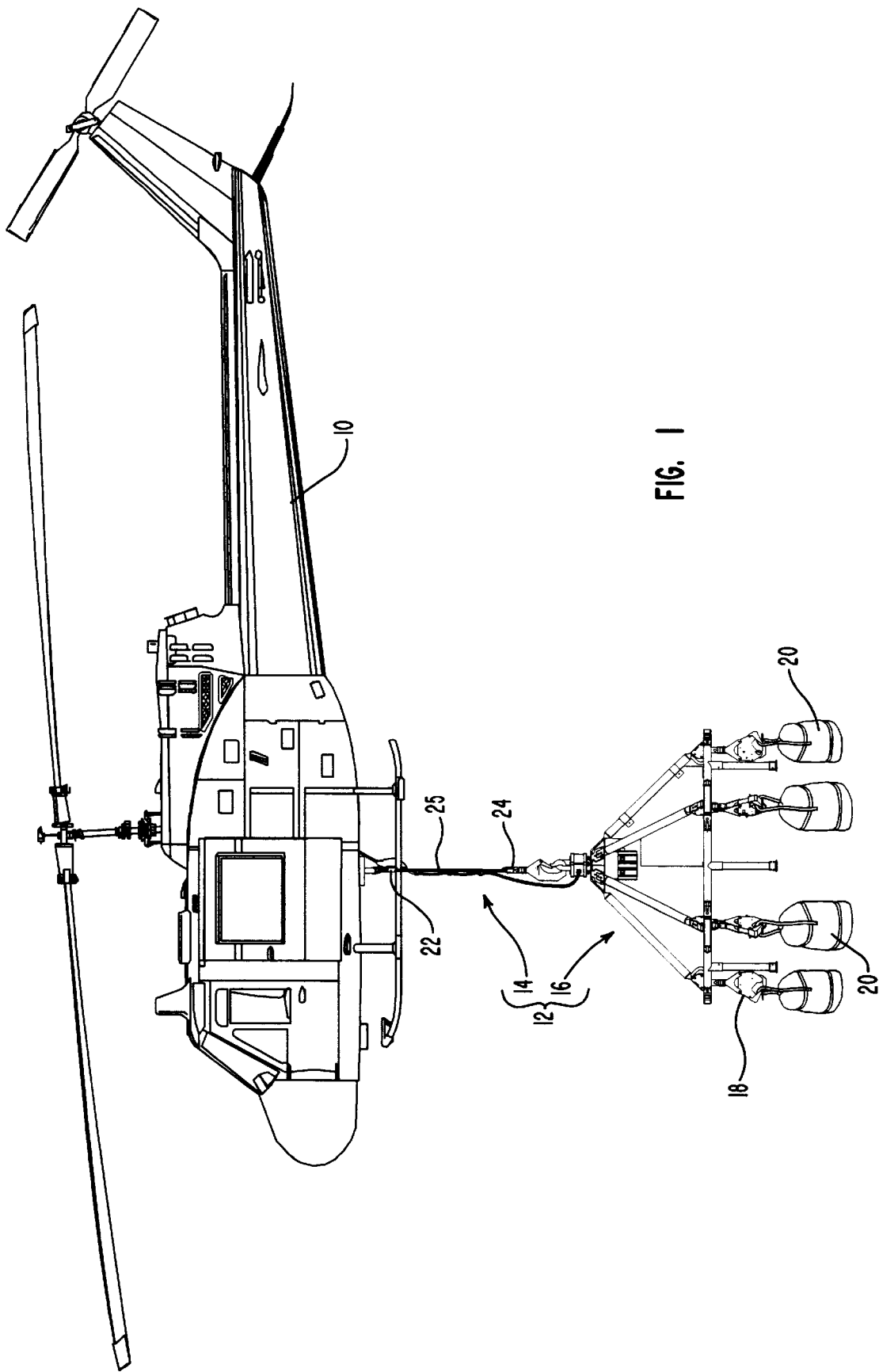
FIG. 1 is an elevated side view of a cargo management system including a cable assembly and airframe that are suspended from a helicopter.

Depicted in FIG. 1 is a side view of a helicopter 10 having a cargo management system 12 suspended therefrom. Cargo management system 12 is shown as generally comprising a cable assembly 14 and an airframe 16 attached to cable assembly 14. Airframe 16 includes a plurality of payload hooks 18 used for selectively attaching and releasing payloads 20. Although cargo management system 12 is shown suspended from helicopter 10, the present invention can be used in combination with other aircraft that are capable of vertical take-off and landing.

Cable assembly 14 includes a includes a cable 25 having a first end 22 attached to helicopter 10 and an opposing second end 24. As better depicted in FIG. 2, a loop 26 is formed at first end 22 by a clamp 28. Loop 26 is used for attachment to a hook 30 or other means for attachment mounted on helicopter 10. Connected at second end 24 by a swivel 32 is a conventional cargo hook 34.

Cable 25 is preferably a multi-stand, stainless steel cable capable of supporting a weight in a range between about 1,000 kg to about 10,000 kg. Alternatively, cable 25 can be made from other types of metals, webbing, or rope made from nylon, composite, or other synthetics depending on the intended use.

The length of cable 25 is dependent on the intended use of the system. Typically, cable 25 must be of sufficient length so that helicopter 10 can lower airframe 16 to the ground for releasing or attaching payloads thereto without endangering helicopter 10 by surrounding objects such as trees or buildings. Alternatively, cable 25 should not be so long as to be unmanageable or result in payloads 20 striking grounded objects during normal flights of helicopter 10. It is envisioned that cable 25 will have a length in a range between about 3 meters to about 40 meters.

Figure 2:
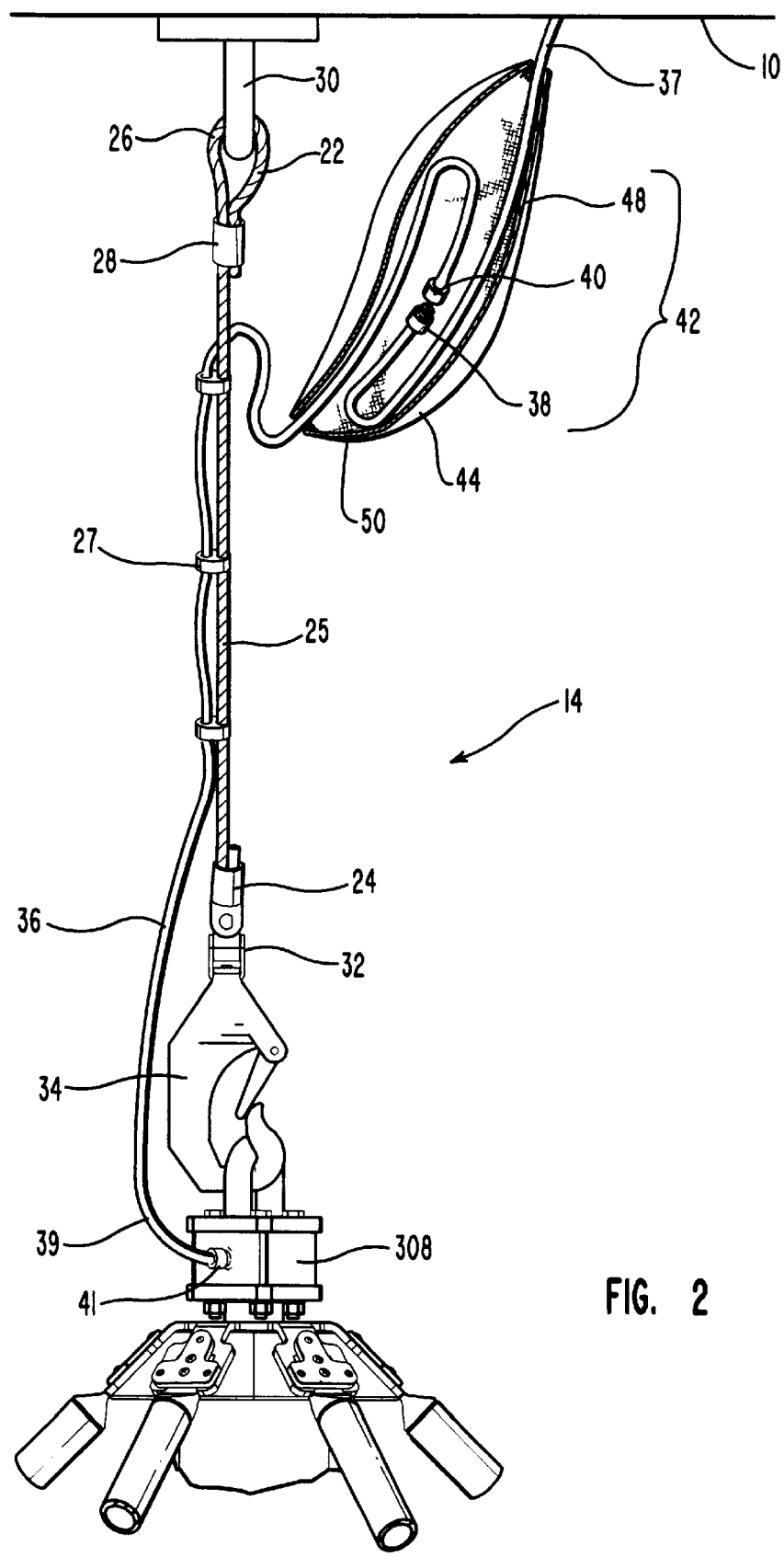
FIG. 2 is an enlarged side view of the cable assembly shown in FIG. 1.

FIG. 2 also shows an electrical control cable 36 having a first end 37 extending from helicopter 10 and a second end 39 attached to airframe 16. As will be discussed later in greater detail, control cable 36 is used for transferring power and signals back and forth between helicopter 10 and airframe 16. To enable a quick release of cargo management system 12 from helicopter 10, an emergency break in control cable 36 is formed by adding electrical connectors 38 and 40. To insure proper release of connectors 38 and 40, a portion 42 of control cable 36 is positioned into an "S" configuration with coupled connectors 38 and 40 located at the center of the "S." A release bag 44, preferably made of nylon, is positioned so as to tightly cover portion 42.

Release bag 44 is designed having a first edge 46 and a second edge 48. Release bag 44 is held closed by a Velcro® strap 50 attached to edges 46 and 48. Release bag 44 is constructed such that when a tension load below about 7 kg is applied across control cable 36, release bag 44 will not open and thus connectors 38 and 40 will not separate. However, for tension loads greater than about 7 kg, such as when cable assembly 14 is released from helicopter 10, release bag 44 will open and connections 36 and 38 automatically separate.

Figure 3:
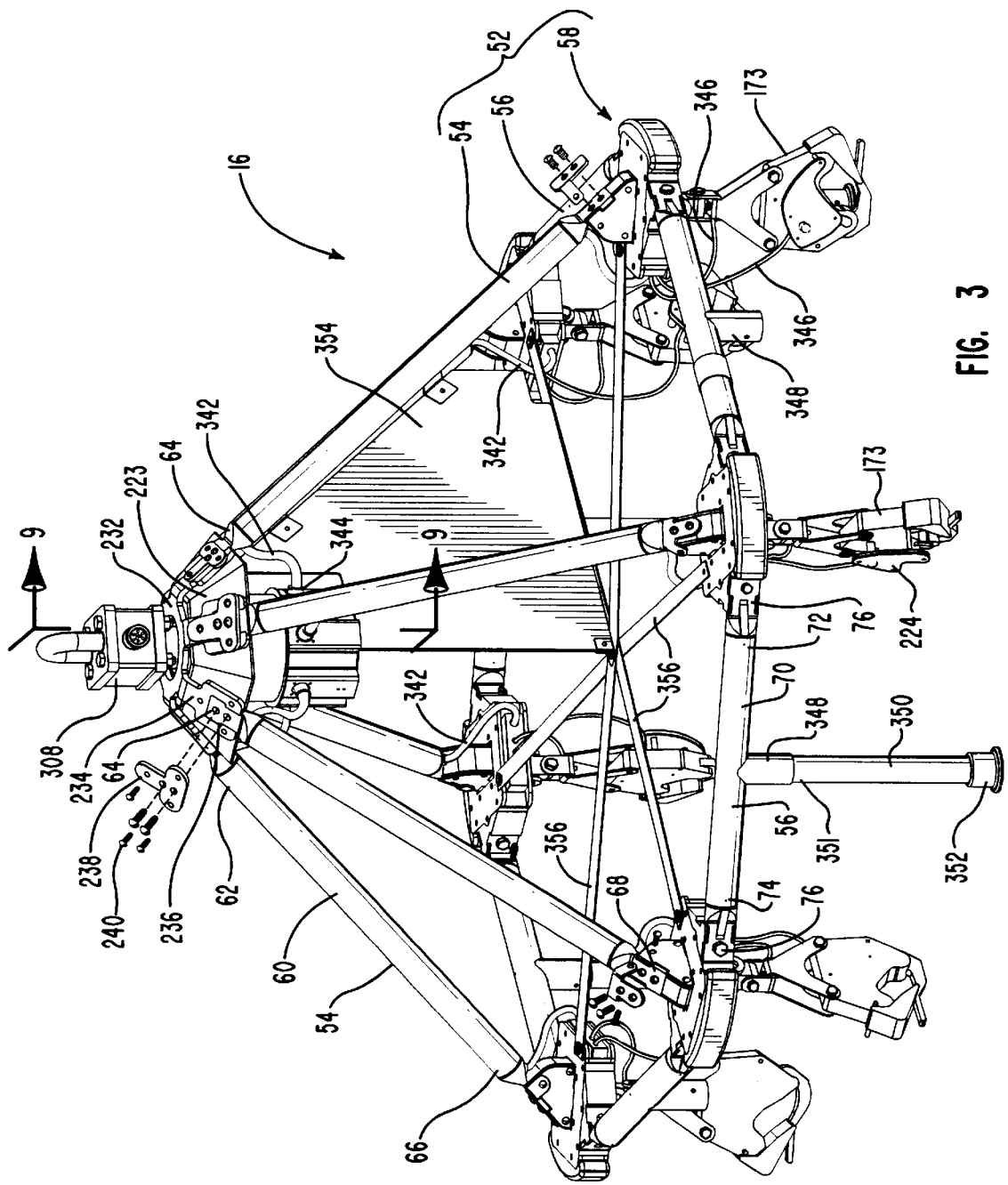
FIG. 3 is a perspective view of the airframe shown in FIG. 1.

Turning to FIG. 3, airframe 16 is shown as including a loading frame 52 which comprises a plurality of vertical struts 54, a plurality of horizontal struts 56, and a plurality of corner assemblies 58 which interconnect vertical struts 54 and horizontal struts 56. Vertical struts 54 are shown as comprising a hollow tubular member 60 having a top end 62 with a T-bracket 64 that is partially received therein and welded thereto. Tubular member 60 also has a bottom end 66 with a T-bracket 68 that is partially received therein and welded thereto. Each of vertical struts 54 are preferably designed to be interchangeable.

Each horizontal strut 56 also comprises a tubular member 70 having opposing ends 72 and 74. Partially received within and welded to end 72 and 74 are T-brackets 76. Horizontal struts 56 are also designed to be interchangeable.

The present invention also provides corner means for selectively connecting vertical struts 54 and horizontal struts 56 to form loading frame 52 having a selected outside perimeter configuration chosen from a plurality of polygonal shapes. By way of example and not by limitation, one example of the corner means includes corner assembly 58 as depicted in FIGS. 4 and 5.

Figure 5:
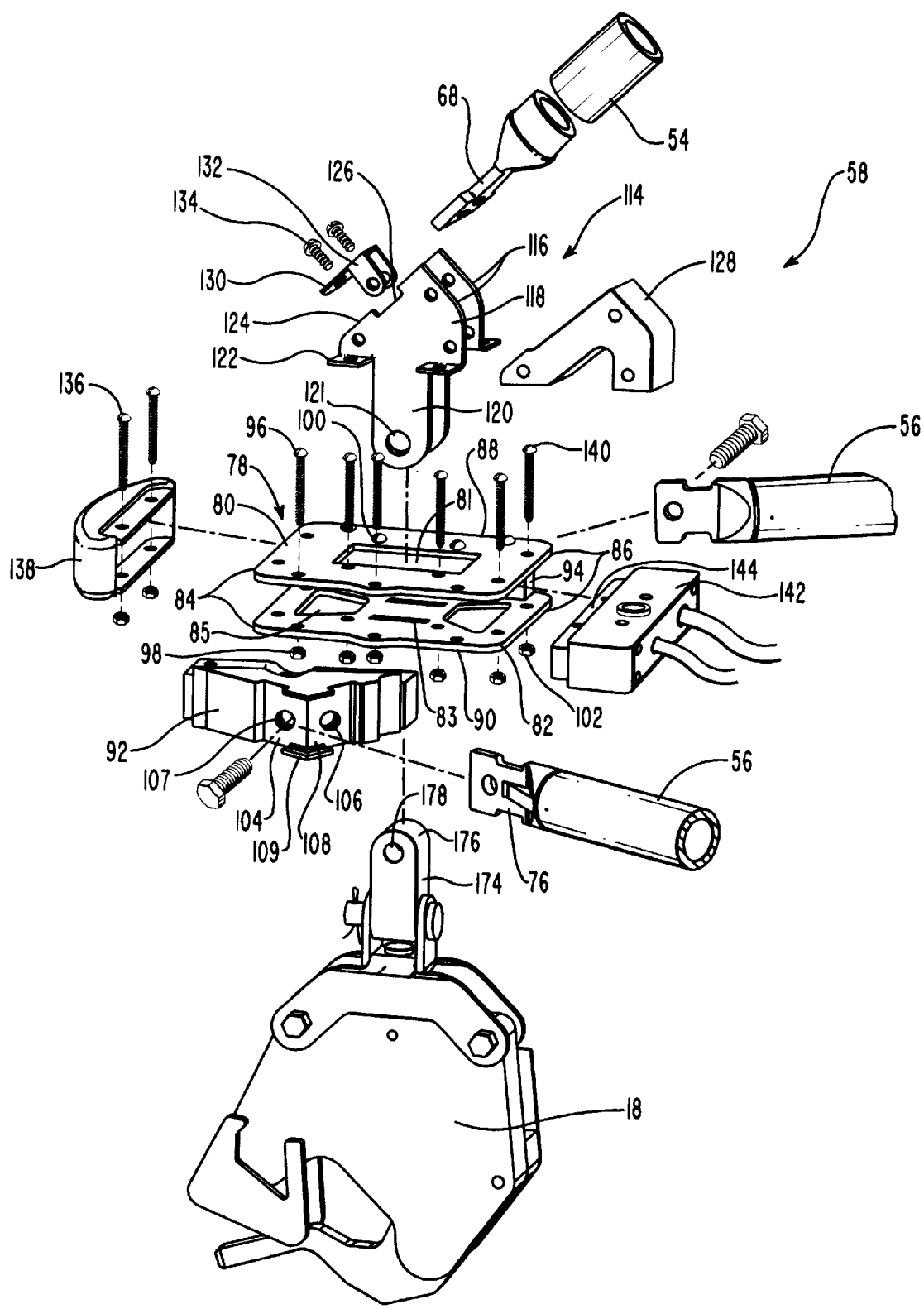
FIG. 5 is an exploded view of the corner assembly shown in FIG. 4.

As best seen in FIG. 5, corner assembly 58 includes a body member 78. In the preferred embodiment, body member 78 is shown as comprising a top plate 80 and a bottom plate 82. Each top plate 80 and bottom plate 82 has an outside end 84, an inside end 86, and opposing sides 88 and 90. Top plate 80 is also shown as having an aperture 81 extending therethrough. In addition, bottom plate 82 has a pair of elongated slots 83 aligned with aperture 81 with a pair of windows 85 individually positioned at opposing ends of bottom plate 82. Top plate 80 and bottom plate 82 are shown as being horizontally disposed in a spaced parallel alignment.

Corner assembly 58 further includes a pair of side brackets 92 and 94. Side bracket 92 is mounted between plates 80 and 82 along sides 90 by bolts 96 and complementary nuts 98. Likewise, side bracket 94 is mounted between plates 80 and 82 along sides 88 by bolts 100 and complementary nuts 102. Side brackets 92 and 94 each have an identical configuration. More specifically, with reference to side bracket 92, each side bracket 92 and 94 includes pair of adjacent faces 104 and 106, each having a threaded bore 107 extending therethrough. Adjacent faces 104 and 106 intersect at an outside corner 108. Ridges 109 project from opposing ends of outside corner 108 and are designed to engage T-bracket 76 of horizontal struts 56 when selectively mounted against one of faces 104 or 106.

Figure 4:
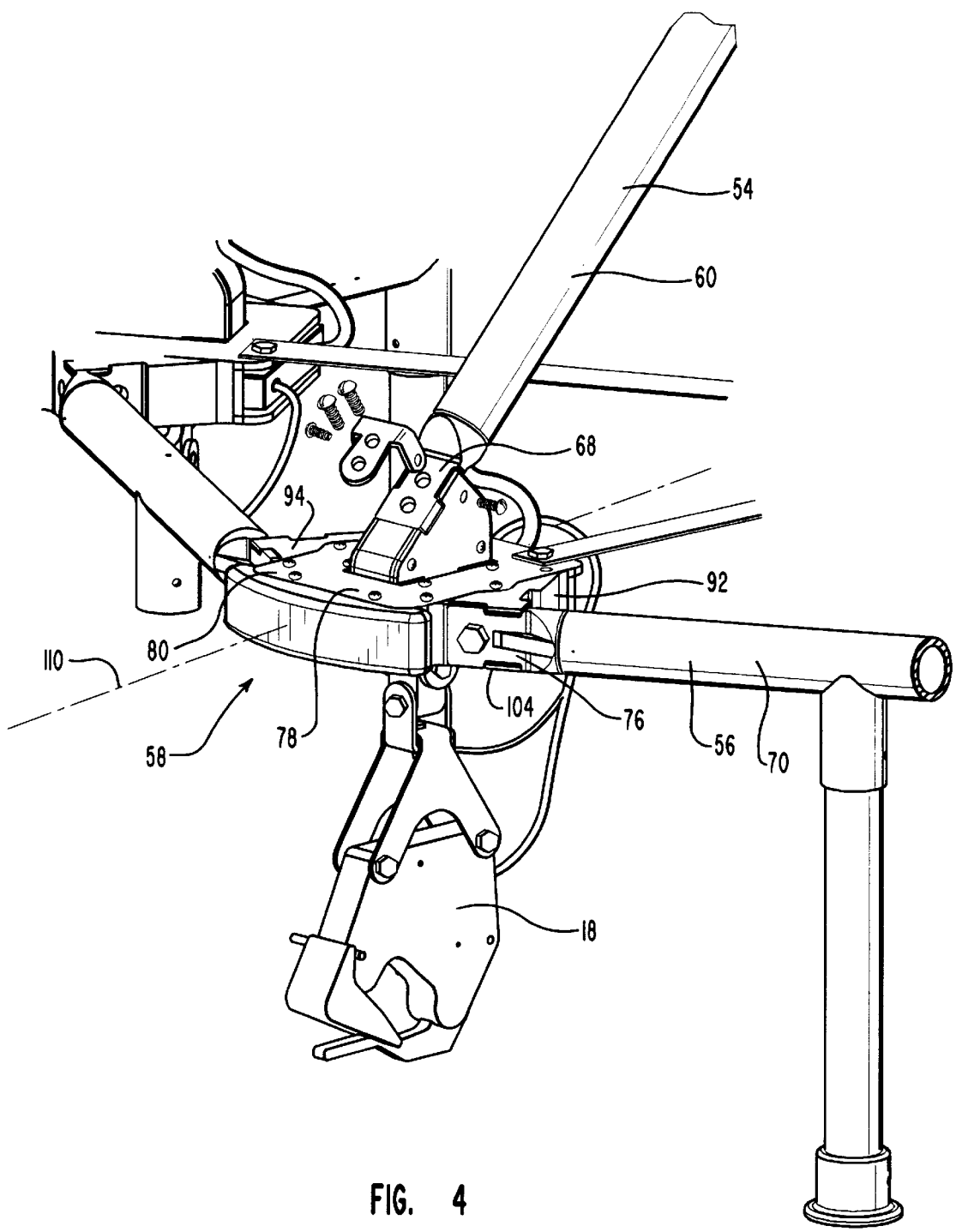
FIG. 4 is an enlarged perspective view of a corner assembly of the airframe shown in FIG. 3.

In the assembled view shown in FIG. 4, side bracket 92 is attached to plates 80 and 82 so that face 104 is positioned for attachment to T-bracket 76 of a selected horizontal strut 56. Furthermore, face 104 is positioned at an inside angle relative to a longitudinal axis 110 of corner assembly 58 to enable six horizontal struts 56 of equal length to be connected at comparable corner assemblies 58 as seen in FIG. 3. As a result, loading frame 52 has an outside perimeter configuration 112 defined primarily by horizontal struts 56 having a six sided polygonal shape.

Figure 6:
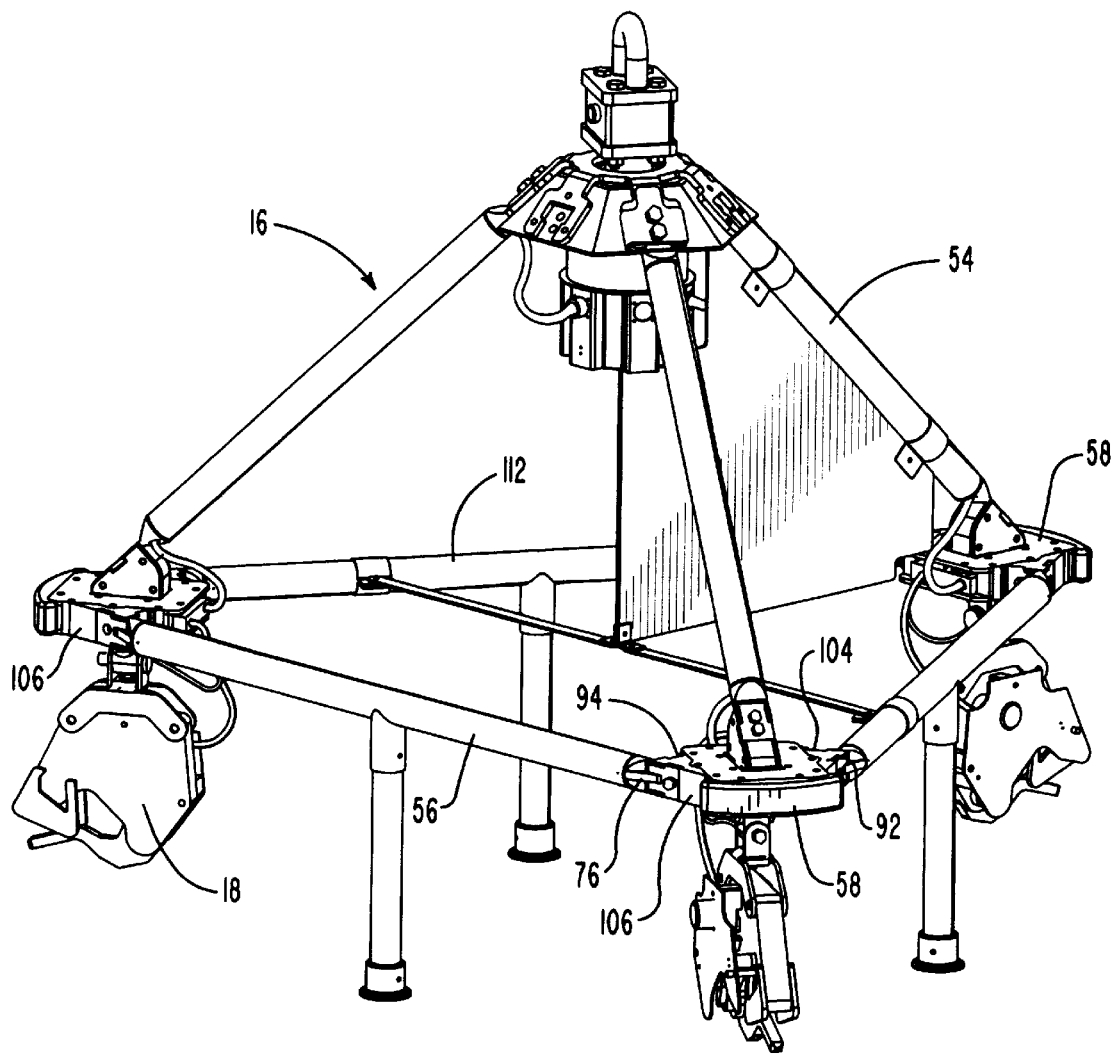
FIG. 6 is a perspective view of the cargo management system shown in FIG. 3 assembled in an alternative configuration.

In an alternative arrangement, as shown in FIG. 6, brackets 92 and 94 are rotated 180 degrees so that face 106 is positioned for selective engagement with T-bracket 76 of horizontal struts 56. Face 106 is positioned at an inside angle relative to longitudinal axis 110 of corner assembly 58 to enable three horizontal struts 56 of equal length to be connected at comparable corner assemblies 58. As a result, loading frame 52 has an outside perimeter configuration 112 having a three sided polygonal shape.

Accordingly, by selectively positioning faces 104 and 106 of brackets 92 and 94 for attachment with Horizontal struts 56, loading frame 52 can be assembled in one of two alternative configurations. Although FIGS. 3 and 6 show loading frame 52 having a six sided and three sided configuration, by altering the angle at which either faces 104 and 106 are disposed, loading frame 52 can be can be assembled having any desired polygonal configuration. This is advantageous since, as will be discussed later, it permits for a select number of payload hooks 18 to be attached to loading frame 52 for carrying a specific number of payloads 20.

Referring back again to FIG. 5, corner assembly 58 also includes a top bracket assembly 114 used in attaching vertical strut 54 thereto. Top bracket assembly 114 comprises a pair of vertically orientated mounting plates 116. Each of mounting plates 116 has a triangular shaped head 118 with an elongated tongue 120 projecting therefrom. An aperture 121 extends through each tongue 120. During assembly, tongue 120 passes through aperture 81 in top plate 80 and corresponding slot 83 in bottom plate 82 so that aperture 121 extends below bottom plate 82. A pair of attachment tabs 122 also project from the side of each head 118 and are used for connecting mounting plates 116 to top plate 80.

Finally, each head 118 has an outside sloping edge 124 with a grooved slot 126 formed therein. Grooved slot 126 is configured to receive T-bracket 68 of vertical strut 54. To secure T-bracket 68 to mounting plates 116, a shoe 128 is received and secured between heads 118 of mounting plates 116. Once T-bracket 68 is received within grooved slot 126, a cover bracket 130 having side tabs 132 is slid over T-bracket 68 and mounting plates 116. Bolts 134 then pass though cover bracket 130, T-bracket 68, and are secured into shoe 128.

Secured to outside ends 84 of plates 80 and 82 by bolts 136 is a bumper 138. Bumper 138 is preferably made of a soft rubber material to protect airframe 16 and, more specifically, corner assembly 58 from damage on impact.

Attached to inside ends 86 of plates 80 and 82 by bolts 140 is an enclosed circuit board 142. The operation of circuit board 142 will be discussed later in greater detail. In one embodiment of the present invention, a light 144 is mounted on and electrically connected to circuit board 142. In this embodiment it is preferred that bumper 138 be translucent to assist lights 144 in illuminating airframe 16 during night use. Furthermore, windows 85 formed through bottom plate 82 are used for allowing light 144 to illuminate payload hooks 18.

Figure 7:
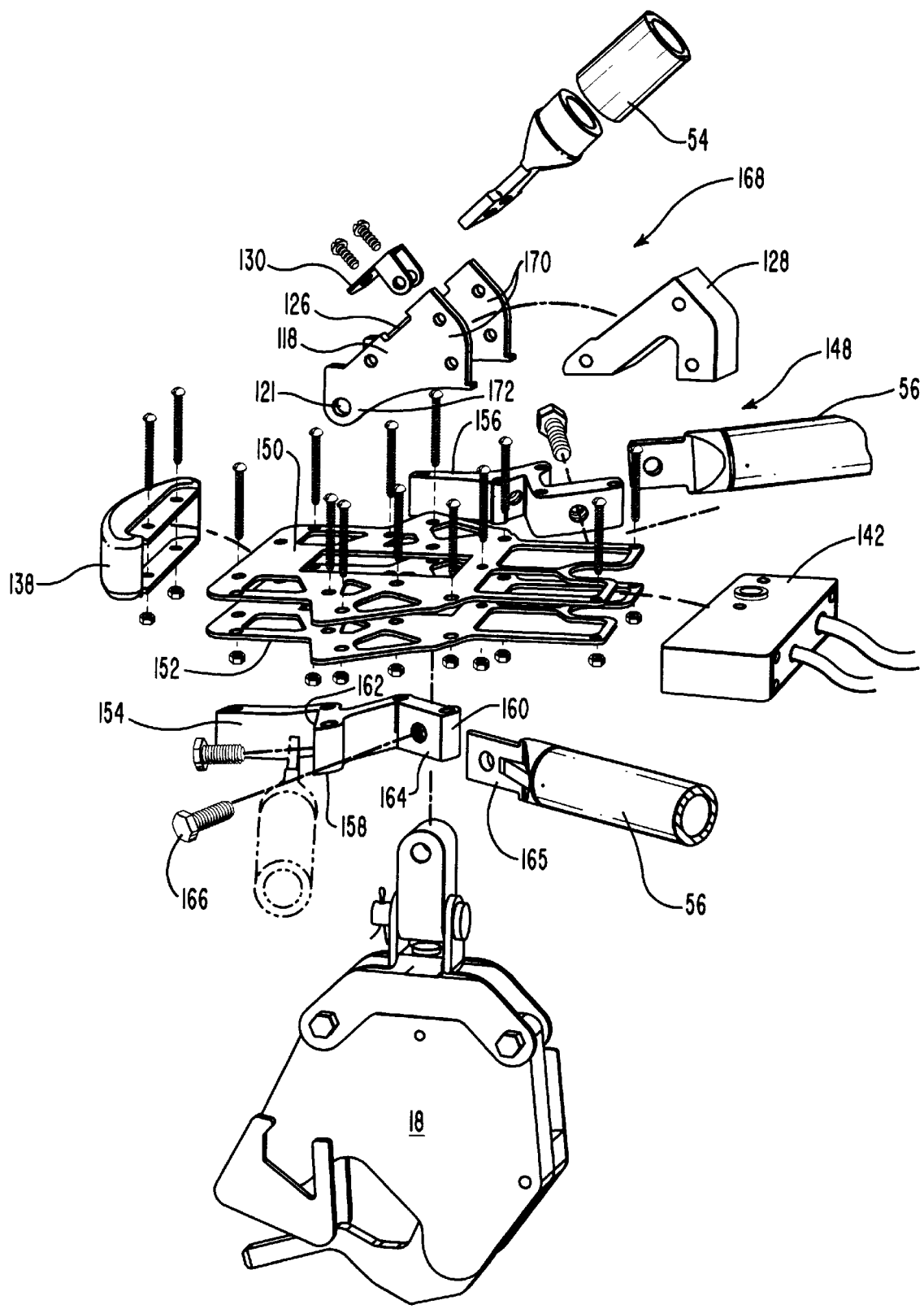
FIG. 7 is an exploded view of an alternative embodiment of the corner assembly shown in FIG. 3.

Turning to FIG. 7, an alternative embodiment of the corner means is disclosed as a corner assembly 148. In comparison to corner assembly 58, corner assembly 148 also comprises a top plate 150 and a bottom plate 152 on which bumper 138 and circuit board 142 can be attached at opposing ends. Corner assembly 148 also includes a pair of side brackets 154 and 156 which have an identical configuration. In contrast to side brackets 92 and 94, side brackets 154 and 156 each include a pair of flanges 158 and 160 which project therefrom at different angles. Flange 158 and 160 each have a face 162 and 164 formed thereon for engagement with horizontal strut 56 by bolt 166. Horizontal struts 54 are shown as having substantially rectangular faced brackets 165 that are welded on opposing ends of horizontal struts 56 and are specifically designed to engage against faces 162 and 164.

By selectively mounting horizontal struts 56 to one of flanges 158 and 160, loading frame 52 can be assembled having an outside perimeter configuration such as those shown in FIGS. 3 and 6. One of the benefits of side brackets 154 and 156 is that they do not have to be removed and rotated to convert loading frame 52 into an alternative configuration. Horizontal struts 56 need only be moved between adjacent flange 158 and 160.

Corner assembly 148 also comprises a top bracket assembly 168 which includes shoe 128 and cover bracket 130 as previously discussed. Top bracket assembly 168 also includes a pair of mounting plates 170. Although mounting plates 170 include head 118 with grooved slot 126 formed thereon, mounting plates 170 are distinguished from mounting plates 116 by the fact that attachment tabs 122 have been removed. Mounting plates 170 are designed to be welded to top plate 150. Furthermore, tongue 120 with aperture 121 has been significantly shortened and moved forward to form a tongue 172 with aperture 121 extending therethrough.

An additional benefit of corner assembly 148 over corner assembly 58 relates to the alignment of horizontal struts 56 and vertical struts 54.configured so that independent of configured so that independent of whether horizontal struts 56 are connected to flange 158 or flange 160, the longitudinal axis of each of the horizontal struts 56 and the vertical strut 54 intersect. As a result, moment forces resulting from the attachment of payloads 20 are reduced at corner assembly 148.

Turning back to FIG. 3, in addition to loading frame 52, airframe 16 also includes payload hooks 18 mounted to loading frame 52. As previously mentioned, payload hooks 18 are used for selectively attaching and releasing payloads 20. Examples of payload hooks 18 includes the 3.000 pound–12,000 pound hooks available from Mechanical Specialties of Seattle, Wash.

Figure 8:
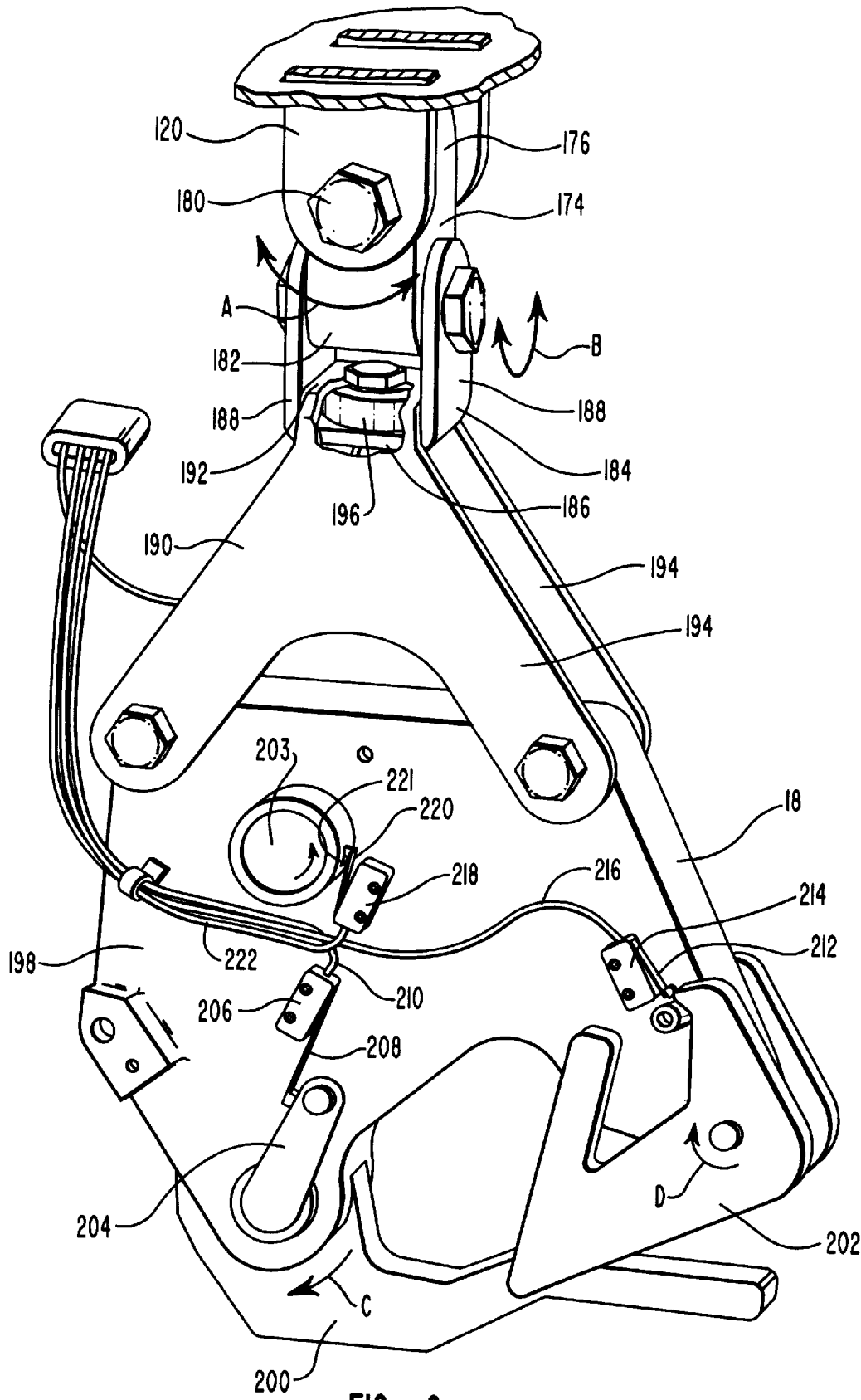
FIG. 8 is an enlarged perspective view of a payload hook shown in FIG. 5.

The present invention also provides coupling means for connecting each of payload hooks 18 to loading frame 52 so that each payload hook 18 maintains a substantial vertical orientation when loading frame 52 is tilted. By way of example and not by limitation, one example of the coupling means comprises a universal joint 174 as depicted in FIG. 5. Universal joint 174 has a top end 176 with a passageway 178 extending therethrough. Top end 176 is configured to fit between tongues 120 of mounting plates 116 which project below bottom plate 82 as previously discussed. By aligning apertures 121 of mounting plates 116 with passageway 178, a bolt 180 can be passed therethrough. Bolt 180 allows rotation of universal joint 174 along arrow A as shown in FIG. 8. To insure ease of rotation of universal joint 174, a bearing assembly can also be positioned within passageway 178.

As also shown in FIG. 8, universal joint 174 also has bottom end 182 with a passageway extending therethrough at an orientation perpendicular to passageway 178. A first C-shaped bracket 184 is connected to bottom 182 of universals joint 174. First C-shaped bracket 184 includes a bridge 186 with flanges 188 projecting from opposing ends thereof. A bolt 190 extends through flanges 188 and bottom end 182 of universal joint 176, so as to permit first C-shaped bracket 184 to freely rotate along arrow B relative to universal joint 174.

A second C-shaped bracket 190 is used to connect first C-shaped bracket 184 to payload hook 18. Second C-shaped bracket 190 also includes a bridge 192 having flared flanges 194 projecting from the ends thereof. Bridge 192 of second C-shaped bracket 190 is seated over bridge 186 of first C-shaped bracket 184 to interconnect C-shaped brackets 184 and 190. Finally, flanges 194 are connected to payload hook 18. In this configuration, as loading frame 52 tilts, for example, when a single payload 20 is carried attached to a single payload hook 18, universal joint 174 permits payload hook 18 to rotate relative to arrows A and B so as to maintain a substantially vertical position.

The present invention also envisions a variety of alternative structures that could be used for the coupling means. By way of example, a ball and socket joint could be used. Alternatively, a ring disposed within an aperture formed on the loading frame could be used.

The ability to rotate each of payload hooks 18 not only prevents the application of unwanted stresses on loading frame 52 and payload hooks 18 but also assists in producing an accurate weight measurement of payloads 20 attached to payload hooks 18. For example, in one embodiment of the present invention, means are disposed between loading frame 52 and payload hook 18 for weighing payload 20 attached to payload hook 18. By way of example and not by limitation, one example of the weighing means includes a compression load cell 196 disposed between bridge 186 of first C-shaped bracket 184 and bridge 192 of second C-shaped bracket 190. As depicted in FIG. 8, load cell 196 is held in place by a pin 197 which passes through bridge 192, load cell 196, and bridge 186.

By using universal joint 174, the force vector resulting from the weight of payload 20 attached to payload hook 18 is always vertically applied over load cell 196. Thus load cell 196 gives a more accurate weight measurement of payload 20 independent of whether or not the loading frame 52 is tilted. One example of load cell 196 includes the 6,000 pound rated compression load cell model number 3500-6 manufactured by Houston Scientific out of Houston, Tex.

The present invention also provides means disposed between loading frame 52 and payload hooks 18 for accurately weighing payload 20 attached to the payload hook 18 when loading frame 52 is tilted. By way of example and not by limitation, one embodiment of the means for accurately weighing payload 20 comprises the above discussed universal joint 174 coupled with load cell 196. In alternative embodiments, it is noted that load cell 196 can comprise any type of compression or tension load cell or strain gauge which could likewise be assembled with the above discussed alternative embodiments of the universal joint 174 to achieve the desired function of the means clause.

As depicted in FIG. 8, each payload hook 18 comprises a housing 198, a load beam 200 rotatably mounted along arrow C to housing 198, and a keeper 202 rotatably mounted to housing 198 along arrow D and adjacent to load beam 200. Load beam 200 is spring loaded and either manually released or electrically released by a celenoid disposed within housing 198. Once payload 20 is attached to load beam 200, keeper 202 acts as a safety latch to prevent unwanted removal of payload 20. Payload hook 18 is also shown as comprising a rotatable locking cylinder 203 which projects from housing 198. Locking cylinder 203 rotates when load beam 200 is unlocked and rotated.

In one embodiment of the present invention, means are provided for electronically determining the position of load beam 200 from within the aircraft attached to airframe 16. By way of example and not by limitation, depicted in FIG. 8 is a manual rotation arm 204 connected to load beam 200 and projecting from housing 198. Arm 204 is configured to rotate simultaneously with load beam 200. Mounted on the exterior of housing 198 is a micro switch 206 with a lever 208 that is biased against arm 204. Accordingly, as load beam 200 is rotated, arm 204 also rotates, thereby actuating micro switch 206. In turn a wire 210 connected to micro switch 206 extends to the aircraft to identify whether micro switch 206 has been actuated.

The present invention also provides means for electronically determining the position of keeper 202 from within the aircraft. By way of example and not by limitation, a micro switch 214 is also mounted on the exterior surface of housing 198. A lever 212 of micro switch 214 is biased against keeper 202 and is actuated as keeper 202 is rotated. A wire 216 extends from micro switch 214 to the aircraft to identify when micro switch 214 has been actuated.

In addition the present invention also provides means for electronically determining the position of locking cylinder 203 from within the aircraft. By way of example and not by limitation, a micro switch 218 is mounted on the exterior surface of housing 198. A lever 220 of micro switch 218 is biased within a recess 221 on locking cylinder 203. Micro switch 218 is thus actuated when locking cylinder 203 is rotated so that lever 220 is pushed out of recess 221. A wire 222 extends from micro switch 214 to the aircraft to identify when micro switch 218 has been actuated.

One example of micro switches 206, 214, and 218 is the lever arm micro switch model number DC1BD5RC manufactured by Cherry Electronics out of Boston, Mass. One of the benefits of the present invention is that micro switches 206, 214, and 218 can be mounted on the exterior of payload hooks 18. As a result it is easy to buy conventional payload hooks 18 and then modify them with the disclosed micro switches. However, to protect micro switches 206, 214, and 218, a cover plate 224, as shown in FIG. 3, is attached on the exterior of payload hooks 18 over micro switches 206, 214, and 218.

Referring again to FIG. 3, airframe 16 also includes a hub assembly 223 that is attached to top end 62 of each of vertical struts 54. As better depicted in FIG. 9, hub assembly 223 comprises a hub 224 having a top end 226 with an annular flared flange 228 encircling and radially projecting out therefrom.

Mounted on top of flange 228 is an annular attachment bracket 230. As better seen in FIG. 3, attachment bracket 230 includes an annular frame 232 having a plurality of C-shaped flanges 234 projecting therefrom. C-shaped flanges 234 define a slot 236 configured to receive T-bracket 64 positioned at top end 62 of each vertical strut 54. Once T-bracket 64 is received within slot 236, an inverted T-plate 238 is selectively mounted by bolts 240 over C-shaped flange 234 and T-bracket 64, thereby securely fastening vertical strut 54 to hub 224.

Returning again to FIG. 9, hub 224 also includes a bottom end 240 and an interior surface 242 defining a passageway 244 longitudinally extending from top end 226 to bottom end 240. Disposed within passageway 244 is a spindle 246 which likewise has a top end 248, a bottom end 250, and an interior passageway 252 that longitudinally extends between top end 248 and bottom end 250.

Spindle 246 has an outside diameter that is smaller than the inside diameter of passageway 244 extending through hub 224. As such, spindle 246 freely rotates within passageway 244. However, to assist in supporting spindle 246 within passageway 244 and to provide a smooth annular rotation of spindle 246, an upper tapered roller bearing assembly 256 is disposed between top end 226 of hub 224 and exterior surface 251 of spindle 246. Bearing assembly 256 comprises an annular cup 258 that is biased against hub 224, an annular cone 260 What is biased against spindle 246, and bearings 262 which rotate between cup 258 and cone 260.

In like manner, a lower tapered bearing assembly 264 is disposed between bottom 240 of hub 224 and exterior surface 251 of spindle 246. Bearing assembly 264 also includes an annular cup 258, an annular cone 260, and bearings 262 as previously discussed with upper tapered roller bearing assembly 256. One example of tapered bearing assemblies 256 and 264 include these type TS single row bearings manufactured by SKF USA out of King of Prussia, Pa. To protect bearing assemblies 256 and 264, an upper bearing seal 266 is positioned above bearing assembly 256 and is configured to provide a sealed engagement between interior surface 242 of hub 224 and exterior surface 251 of spindle 246. Likewise, a lower bearing seal is positioned beneath bearing assembly 264 and is also configured to produce a sealed engagement between interior surface 242 of hub 224 and exterior surface 251 of spindle 246.

Each bearing seal 266 and 268 is shown as generally comprising an annular outside housing 270 that is biased against hub 224. Housing 270 is formed with an annular inside groove 272. Groove 272 is configured to receive an annular rubber gasket 274 which is biased against exterior surface 251 of spindle 246 so as to make a sealed engagement therewith and to simultaneously allow spindle 246 to freely rotate. One example of bearing seals 266 and 268 include type and style: CRWHA1 available from Chicago Rawhide of Elgin, Ill.

Figure 9:
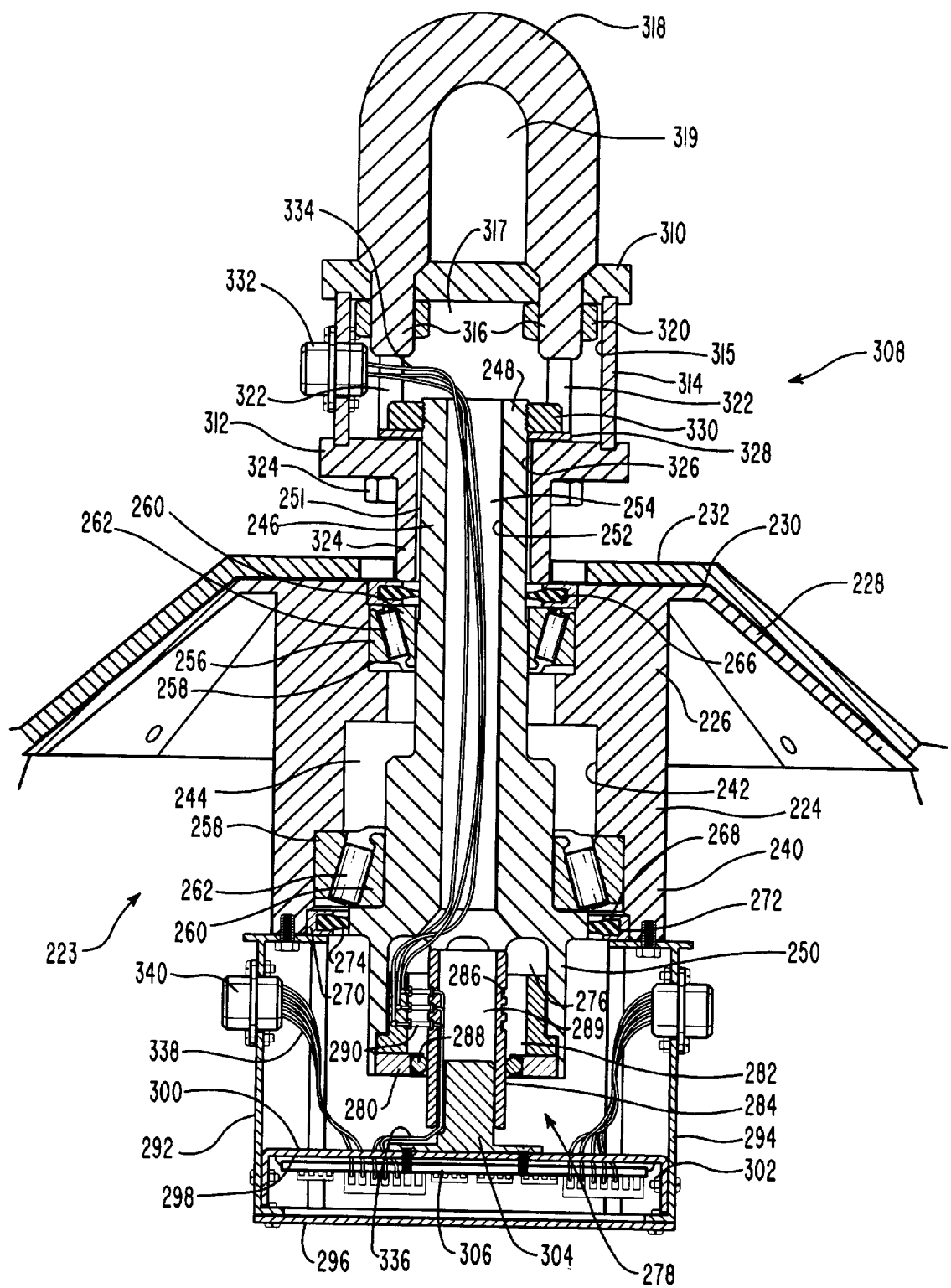
FIG. 9 is a cross section side view of the hub assembly taken along section lines 9—9 as shown in FIG. 3.

As also depicted in FIG. 9, bottom end 250 of spindle 246 projects below bottom end 240 of hub 224. Likewise, bottom end 250 of spindle 246 is shown as having an enlarged recess 276 formed thereat and in communication with passageway 254. Mounted within recess 276 is a slip ring assembly 278. Slip ring assembly 278 is shown as generally comprising an annular stator 280 that is attached to spindle 246 and has a passageway 282 extending therethrough. Received within passageway 282 is a cylindrical rotor 284 having a series of annular contact rings 286 encircling the exterior surface thereof. Rotor 284 also has a passageway 289 longitudinally extending therethrough. A bearing assembly 288 is positioned between stator 280 and rotor 284 to allow rotor 284 to freely rotate within passageway 282 of stator 280. Finally a plurality of contact arms 290 extend from stator 280 and are biased against contact rings 286 to provide an electrical connection therebetween. One example of slip ring assembly 278 comprises model number 1967-4 manufactured by Fabricast out of El Monte, Calif.

Bottom end 250 of spindle 246 and slip ring assembly 278 are housed within a removable cover 292 that is attached to hub 224. Cover 292 comprises an annular side wall 294 and a base plate 296. Positioned within cover 292 and mounted at points along the interior of side wall 294 is an elongated plate 298. Plate 298 has a top surface 300 and a bottom surface 302. Mounted on top surface 300 of plate 298 is a locking pin 304 which is received in locking engagement within passageway 289 of rotor 284. As will be discussed later in greater detail, a circuit board 306 is mounted on bottom surface 302 of plate 298. In the assembly shown in FIG. 9, spindle 246 and stator 280 can remain stationary while hub 242, cover 292, locking pin 304, and rotor 284 freely rotate relative thereto.

The present invention also provides attachment means for connecting loading frame 52 to cable assembly 14. By way of example and not by limitation, depicted in FIG. 9 is a U-bolt assembly 308 which is connected to top end 248 of spindle 246. U-bolt assembly 308 generally comprises a top plate 310, a bottom plate 312, and a tubular housing 314 extending therebetween. Tubular housing 314 includes an interior surface 315 defining a chamber 317. To secure top plate 310, bottom plate 312, and tubular housing 314 together, a plurality of threaded shafts 322 are formed projecting from the bottom surface of top plate 310. Shafts 322 pass through chamber 317 within tubular housing 314 and through apertures formed in bottom plate 312. Nuts 324 are then attached to shafts 322 so as to bias top plate 310 and bottom plate 312 against tubular housing 314.

U-bolt assembly 308 also includes a U-bolt 318 having threaded ends 316. Ends 316 extend through top plate 310 and are secured thereto by threaded nuts 320. In this configuration, U-bolt 318 and top plate 310 define a passageway 319 configured to receive cargo hook 34 of cable assembly 14 as previously discussed with regard to FIG. 2.

Extending from bottom plate 312 is a tubular spacer 324. A passageway 326 extends through both tubular spacer 324 and bottom plate 312 so as to communicate with chamber 317 of tubular housing 314. Passageway 326 is configured to receive top end 248 of spindle 246 so that top end 248 is positioned within chamber 317 of tubular housing 314. After a lock washer 328 is positioned over top end 248 of spindle 246, a nut 330 is threadedly engaged to top end 248 thereby securing U-bolt assembly 308 to hub assembly 223.

The present invention also includes swivel means for enabling loading frame 252 to freely rotate relative to the above discussed attachment means. By way of example and not by limitation, one embodiment of the swivel means includes hub assembly 223 as discussed above with regard to FIG. 9. The swivel means provides the benefit of eliminating torsional stresses on cable assembly 14 and the connections between cable assembly 14, helicopter 10 and airframe 16. Furthermore, conventional helicopters are typically equipped with mounting hooks or other comparable structures that do not swivel. Furthermore, conventional cable assemblies are manufactured with nonswiveling components. Accordingly, by incorporating the swivel means directly on airframe 16, airframe 16 can be used with convention helicopters and cable assemblies without substantial modification thereto.

In addition, the present invention includes transferring electrical signals between loading frame 52 and the U-bolt assembly 318 when loading frame 52 freely rotates relative to the U-bolt assembly 318. By way of example and not by limitation, the means for transferring electrical signals includes slip ring assembly 278 used in conjunction hut assembly 223.

The present invention also includes an electrical system for conveying power and electrical signals between helicopter 10 and airframe 16. More specifically, the electrical system is used for selectively operating payloads hooks 18, load cells 196, micro switches 206, 214, and 218, and lights 144, as previously discussed, from helicopter 10. The electrical system includes control cable 36 as depicted in FIG. 2. First end 37 of control cable 36 is electrically coupled to helicopter 10 to a power source and a control board. Control cable 36 extends along cable 25 and is attached thereto by ties 27. Second end 39 of control cable 36 has an electrical connector 41 attached thereto which is electrically coupled to U-bolt assembly 308.

More specifically, as depicted in FIG. 9, electrical connector 41 is selectively coupled to electrical connector 332 mounted on tubular housing 314. Extending from electrical connector 332 are a plurality of wires 334 which extend from connector 332 into chamber 317 of tubular housing 314, along passageway 254 of spindle 246, and finally connect to contact arms 290. As previously discussed with regard to slip ring assembly 278, contact arms 290 are biased against contact rings 286 to provide electrical communication therebetween.

A plurality of electrical wires 336 extend from contact rings 286 to circuit board 306. In turn, a variety of discrete sets of wires 338 extend from circuit board 306 to a plurality of discrete electrical connectors mounted on and extending through cover 292. It is preferred that the number of connectors 340 correspond to the maximum number of payload hooks 18 that can be used with airframe 16.

Turning back to FIG. 3, the electrical system is further shown as comprising a plurality of electrical cables 342. Each electrical cable 342 has a connector 344 formed at one end. Connector 344 is selectively connected to connector 340 on cover 292. Each electrical cable 342 passes through an aperture in T-bracket 64, extends through tubular member 60 of vertical strut 54, and exits through an aperture in T-bracket 68. Cable 342 then extends and connects to enclosed circuit board 142. Finally, wires 346 extend from circuit board 142 and electrically connect with payload hooks 18, micro switches 206, 214, and 218, load cell 196, and lights 144.

Each enclosed circuit board 142 is designed to transmit and receive signals to and from helicopter 10 and to either periodically or continually monitor or actuate corresponding payload hook 18, micro switches 206, 214, and 218, load cell 196, and light 144 based on the signals received from helicopter 10. Circuit board 306 is used primarily for selectively transmitting parallel signals to each of enclosed circuit boards 142. Circuit board 306 can also be designed as a redundant backup to perform the function of one or more of enclosed circuit boards 142 should one or more of enclosed circuit boards 142 fail.

Still referring to FIG. 3, airframe 16 also includes means for supporting the plurality of payload hooks 18 off the ground during repetitive landing of airframe 16. By way of example and not by limitation, one embodiment of the means for supporting the plurality of payload hooks 18 a distance off the ground comprises a short attachment tube 348 welded to the exterior surface of each horizontal strut 56 so as to project vertically downward. The means further includes leg 350 having a first end 351 which is configured to be selectively received within attachment tube 348. First end 351 can be connected to attachment tube 348 by a variety of connecting means such as threaded engagement or aligned apertures through which a pin or bolt can be inserted. A foot 352 is mounted at the opposing end of leg 350 and is designed for resting on the ground surface. Leg 350 preferably has a length that enables loading frame 52 and each of payload hooks 18 to be supported off the ground surface when airframe 16 is resting on a ground surface.

Finally, the present invention also includes means for substantially preventing annular rotation of airframe 16 during flight thereof. By way of example and not by limitation, one embodiment of the means for preventing annular rotation includes a stabilizing wing 354 that is vertically oriented and secured along a length of a select vertical strut 54. Straps 356 are attached to and extend between opposing payload hooks 18. Straps 356 add structural stability to airframe 16 and further provide a surface for securing stabilizing wing 354.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An airframe for selectively attaching and selectively releasing multiple payloads suspended by a cable from an aircraft, the airframe comprising:
   (a) a loading frame;
   (b) attachment means for connecting the loading frame to the cable;
   (c) swivel means for enabling the loading frame to freely rotate relative to the attachment means;
   (d) a plurality of payload hooks attached to the loading frame; and
   (e) means for transferring electrical signals between a loading frame and the attachment means when the loading frame freely rotates relative to the attachment means.

2. An airframe as recited in claim 1, wherein the attachment means comprises a U-bolt configured for attachment to the cable.

3. An airframe as recited in claim 1, wherein the swivel means comprises:
   (a) a hub mounted to the loading frame, the hub having a passageway extending therethrough;
   (b) a spindle disposed within the passageway of the hub, the spindle being rigidly connected to the attachment means; and
   (c) a bearing assembly disposed between the hub and the spindle to permit the hub and attached loading frame to freely rotate relative to the spindle.

4. An airframe as recited in claim 1, wherein:
   (a) the swivel means comprises:
      (i) a hub mounted to the loading frame, the hub having a passageway extending therethrough;
      (ii) a spindle disposed within the passageway of the hub, the spindle being rigidly connected to the attachment means; and
      (iii) a bearing assembly disposed between the hub and the spindle to permit the hub and attached loading frame to freely rotate relative to the spindle; and
   (b) the means for transferring the electrical signals comprises:
      (i) a stator mounted to the spindle;
      (ii) a rotor mounted to the hub;
      (iii) a contact ring mounted on the rotor; and
      (iv) a contact arm mounted on the stator and biased against the contact ring.

5. An airframe as recited in claim 1, wherein each of the plurality of cargo hooks is attached to the loading frame by a universal joint.

6. An airframe as recited in claim 1, further comprising a load cell disposed between each of the payload hooks and the loading frame to selectively measure the weight of the payload attached to each of the payload hooks.

7. An airframe as recited in claim 1, further comprising a plurality of legs attached to the loading frame and extending below the loading frame to support the plurality of payload hooks off the ground during landing of the airframe.

8. An airframe as recited in claim 1, further comprising a vertically oriented stabilizing wing mounted on the loading frame, the stabilizing wing being configured to substantially prevent annular rotation of the airframe during flight thereof.

9. A cargo management system for selectively attaching and selectively releasing multiple payloads suspended from an aircraft, the cargo management system comprising:
   (a) a loading frame capable of supporting multiple payloads, the loading frame comprising:
      (i) a plurality of elongated vertical struts, each of the vertical struts having a top end and a bottom end;
      (ii) a plurality of elongated horizontal struts each having opposing ends; and
      (iii) corner means for selectively connecting the vertical struts and the horizontal struts to form the loading frame having a selected outside perimeter configuration chosen from a plurality of polygonal shapes; and
   (b) a plurality of payload hooks attached to the loading frame.

10. A cargo management system as recited in claim 9, wherein the corner means comprises:
   (a) a body member having a top, a bottom, an outside end, an inside end, and opposing sides;
   (b) a pair of side brackets disposed at the opposing sides of the body member, each of the side brackets having a plurality of faces formed thereon at varying angles, each of the faces being configured to permit selective attachment of one of the opposing ends of a horizontal strut; and
   (c) a top bracket secured to the top of the body member, the top bracket being configured for attachment to the bottom end of a vertical strut.

11. A cargo management system as recited in claim 10, wherein the body member comprises:
   (a) a top mounting plate having an outside end, and inside end, and opposing sides; and
   (b) a bottom mounting plate having an outside end, and inside end, and opposing sides, the bottom mounting plate being spaced in parallel alignment with the top mounting plate.

12. A cargo management system as recited in claim 9, wherein the selected outside perimeter configuration is three sided.

13. A cargo management system as recited in claim 9, wherein the selected outside perimeter configuration is six sided.

14. A cargo management system as recited in claim 10, further comprising a bumper mounted to the outside end of the body member.

15. A cargo management system as recited in claim 14, further comprising:
   (a) the bumper being translucent; and
   (b) a light being disposed within the body member to illuminating the bumper.

16. A cargo management system as recited in claim 10, further comprising the top bracket extending through the body member and attaching to one of the plurality of payload hooks.

17. A cargo management system as recited in claim 16, wherein the payload hook is attached to the top bracket by a universal joint.

18. A cargo management system as recited in claim 9, further comprising:
(a) a hub having a passageway extending therethrough, each of the top ends of the vertical struts being attached to the hub;
(b) a spindle disposed within the passageway of the hub; and
(c) a bearing assembly disposed between the hub and the spindle to permit the hub to freely rotate relative to the spindle.

19. A cargo management system as recited in claim 18, further comprising a slip ring assembly, the slip ring assembly including:
(a) a stator mounted to the spindle;
(b) a rotor mounted to the hub;
(c) a contact ring mounted on the rotor; and
(d) a contact arm mounted on the stator and biased against the contact ring.

20. A cargo management system as recited in claim 18, further comprising a cable connecting the load frame to the aircraft.

21. A cargo management system as recited in claim 9, further comprising a plurality of legs attached to the loading frame and extending below the loading frame to support the plurality of payload hooks off the ground during landing of the cargo management system.

22. A cargo management system for selectively attaching and selectively releasing multiple payloads suspended from an aircraft, the cargo management system comprising:
(a) a loading frame capable of supporting multiple payloads;
(b) a payload hook;
(c) coupling means for connecting the payload hook to the loading frame so that the payload hook maintains a substantial vertical orientation as the loading frame is tilted; and
(d) means disposed between the loading frame and the payload hook for weighing a payload attached to the payload hook.

23. A cargo management system as recited in claim 22, wherein the coupling means comprises a universal joint extending between the payload hook and the loading frame.

24. A cargo management system as recited in claim 22, wherein the measuring means comprises a load cell.

25. A cargo management system as recited in claim 22, wherein the payload hook comprises:
(a) a housing;
(b) a load beam rotatably mounted to the housing;
(c) a keeper rotatably mounted to the housing adjacent to the load beam; and
(d) a rotating locking cylinder extending from the housing.

26. A cargo management system as recited in claim 25, means for electronically determining the position of the load beam from within the aircraft.

27. A cargo management system as recited in claim 25, means for electronically determining the position of the keeper from within the aircraft.

28. A cargo management system as recited in claim 25, means for electronically determining the position of the locking cylinder from within the aircraft.

29. A cargo management system as recited in claim 22, wherein the airframe comprises a plurality of vertical struts and horizontal struts that are interconnected at corners.

30. A cargo management system for selectively attaching and selectively releasing multiple payloads suspended from an aircraft, the cargo management system comprising:
(a) a loading frame capable of supporting multiple payloads;
(b) a payload hook; and
(c) means disposed between the loading frame and the payload hook for accurately weighing a payload attached to the payload hook when the loading frame is tilted.

31. A cargo management system as recited in claim 30, wherein the means comprises:
(a) a universal joint having a top end hingedly attached to the loading frame and a bottom end hingedly attached to the payload hook so that the payload hook maintains a substantially vertical orientation as the loading frame is tilted; and
(b) a load cell disposed between the universal joint and the payload hook so as to read the weight of the payload attached to the payload hook.

* * * * *